(12) United States Patent
Delaunay

(10) Patent No.: US 9,878,747 B2
(45) Date of Patent: Jan. 30, 2018

(54) FASTENER FOR FASTENING A SPARE WHEEL CRADLE TO AN UNDERBODY

(71) Applicant: RENAULT S.A.S., Boulogne Billancourt (FR)

(72) Inventor: Guillaume Delaunay, Vernouillet (FR)

(73) Assignee: RENAULT S.A.S., Boulogne Billancourt (FR)

( * ) Notice: Subject to any disclaimer, the term of this patent is extended or adjusted under 35 U.S.C. 154(b) by 0 days.

(21) Appl. No.: 15/106,647

(22) PCT Filed: Dec. 9, 2014

(86) PCT No.: PCT/FR2014/053234
§ 371 (c)(1),
(2) Date: Jun. 20, 2016

(87) PCT Pub. No.: WO2015/092214
PCT Pub. Date: Jun. 25, 2015

(65) Prior Publication Data
US 2016/0339973 A1 Nov. 24, 2016

(30) Foreign Application Priority Data

Dec. 20, 2013 (FR) ..................................... 13 63172

(51) Int. Cl.
*B62D 43/04* (2006.01)

(52) U.S. Cl.
CPC ..................................... *B62D 43/04* (2013.01)

(58) Field of Classification Search
CPC ....................................................... B62D 43/04
USPC ........................................... 224/42.12, 42.23
See application file for complete search history.

(56) References Cited

U.S. PATENT DOCUMENTS

| 4,976,384 A | * | 12/1990 | Daniels | ................ | B62D 43/002 |
|   |   |   |   |   | 224/402 |
| 5,531,558 A | * | 7/1996 | Ruescher | ............. | B62D 43/045 |
|   |   |   |   |   | 224/42.21 |
| 9,359,019 B2 | * | 6/2016 | Fujiwara | ................ | B62D 43/04 |

(Continued)

FOREIGN PATENT DOCUMENTS

| DE | 88 04 878 U1 | 8/1988 |
| FR | 2 695 098 A1 | 3/1994 |
| JP | 56 105486 | 8/1981 |

(Continued)

OTHER PUBLICATIONS

International Search Report dated Apr. 21, 2015 in PCT/FR2014/053234 filed Dec. 9, 2014.

(Continued)

*Primary Examiner* — Justin Larson
(74) *Attorney, Agent, or Firm* — Oblon, McClelland, Maier & Neustadt, L.L.P.

(57) ABSTRACT

An assembly for holding a spare wheel of a motor vehicle includes a cradle, a cradle support, and a holding member. The cradle accommodates a spare wheel and is mounted pivotably between a closed position and an open position. The cradle support includes a link area fixed to the underside of the vehicle and a part forming a pivot for the cradle. The holding member of the cradle support or of the cradle includes an adjustment portion extending under the link area of the cradle support or of the cradle when the motor vehicle is in the driving position.

16 Claims, 4 Drawing Sheets

(56) References Cited

U.S. PATENT DOCUMENTS

2015/0266523 A1* 9/2015 Fujiwara ................ B62D 43/04
                                                          224/42.23
2016/0339973 A1* 11/2016 Delaunay ............... B62D 43/04

FOREIGN PATENT DOCUMENTS

| JP | 60-30883 | 3/1985 |
| JP | 02-77189 | 6/1990 |

OTHER PUBLICATIONS

French Search Report dated Sep. 4, 2014 in FR 1363172 filed Dec. 20, 2013.

* cited by examiner

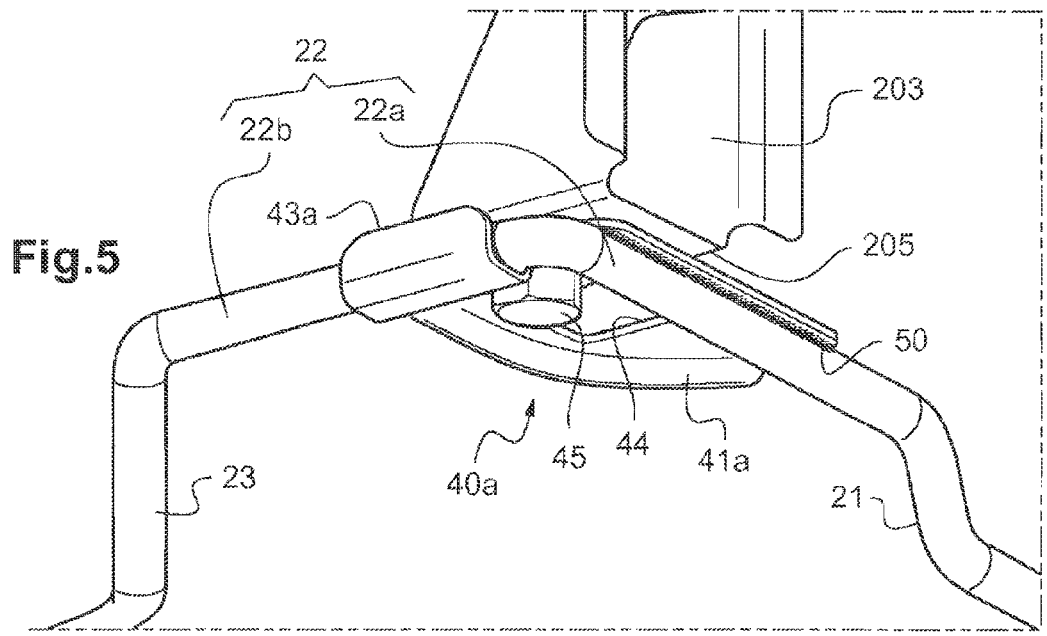
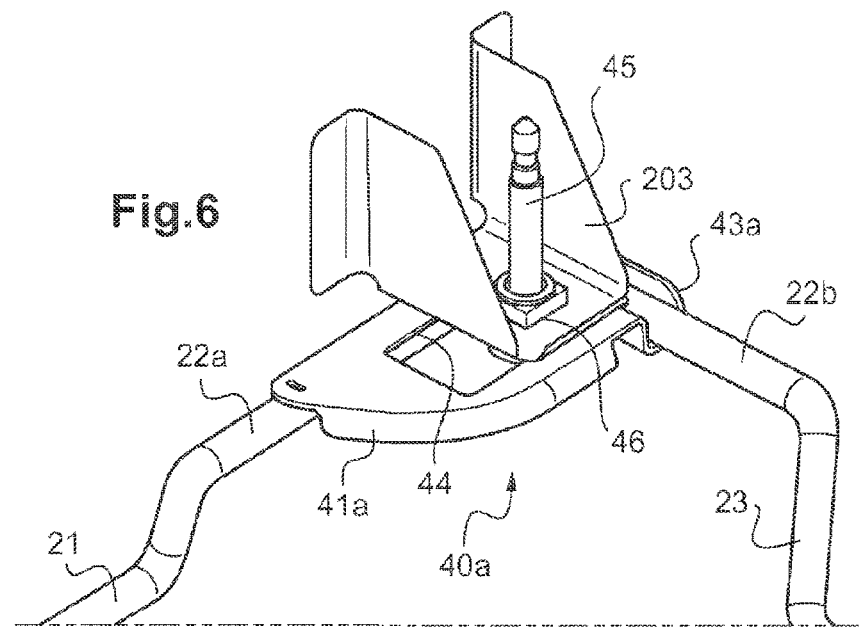

FASTENER FOR FASTENING A SPARE WHEEL CRADLE TO AN UNDERBODY

BACKGROUND

The invention relates to the field of motor vehicles, and more particularly to that of devices for accommodating a spare wheel below a motor vehicle.

A spare wheel of a vehicle is generally retained below the floor of the vehicle by means of a support, which itself is suspended below the body or chassis of the vehicle. A support of this type can be actuated such as to release the spare wheel when the latter must be used. Supports of this type are described for example in FR 2 922 669 and FR 2 723 715.

Spare wheel supports which are arranged on the underface of motor vehicle bodies are subjected to difficult functioning conditions. The supports are subject for example to strong vibrations, impacts, projections, corrosive conditions, etc. Irrespective of the origin, including during the production or assembly, malfunctioning or breakage of a connection between a support of this type and the remainder of the vehicle constitutes a high risk. When incidents of this type occur below a vehicle which is travelling, the consequences for the safety of the passengers of the vehicle and other road users can be serious.

BRIEF SUMMARY

The objective of the invention is to eliminate the aforementioned disadvantages.

The applicant proposes an assembly for retention of a spare wheel of a motor vehicle, comprising:
- a cradle, comprising a connection area which is secured in a removable manner on the underface of the motor vehicle, said cradle being able to accommodate a spare wheel of a motor vehicle, the cradle being fitted such as to pivot between a closed position, in which the handling of a spare wheel is prevented, and an open position, in which the handling of the spare wheel is permitted;
- a cradle support, comprising a connection area which is secured on the underface of the motor vehicle, and a part which forms a pivot for the cradle.

The assembly additionally comprises at least one unit for retention of the cradle support and/or of the cradle. The retention unit comprises a take-up portion which extends below the connection area of the cradle support or the cradle, in particular when the motor vehicle is in the travelling position.

The retention assembly can have the following characteristics, alone or in combination:
- the unit for retention of the cradle support and/or of the cradle is secured on the underface of the motor vehicle. In particular, the unit for retention of the cradle is secured in a removable manner, for example by being screwed, on the underface of the motor vehicle. This unit for retention of the cradle can in particular form part of a lock which is designed to lock the cradle in the closed position;
- the connection area of the cradle support is secured on the underface of the motor vehicle at least partly by welding. Securing of this type is rapid to implement, and compatible with the assembly chains which exist in the motor vehicle field;
- the connection area of the cradle support is secured on the underface of the motor vehicle at least partly by screwing and/or clamping. Securing of this type can easily be repaired in the event of malfunctioning;
- the take-up portion of the retention unit is in the form of a hook. A hook of this type forms a stable seat for accommodation of the connection area of the cradle support;
- the retention unit comprises a bent metal plate. The production of a unit of this type is rapid and inexpensive. No additional complex part is necessary;
- the retention unit and the cradle support or the cradle are welded to one another. The retention unit and the cradle support or the cradle can be assembled independently from the remainder of the vehicle. Their mutual positioning is pre-established, and the risk of error during the assembly on the vehicle body is reduced;
- the retention unit is made in a single piece. The presence of an assembly point which can give rise to fragility is avoided. The number of production operations is limited;
- the take-up portion of the retention unit is designed to be active only when the securing of the cradle support or the cradle on the underface of the motor vehicle is defective, or when the securing of the connection area on the retention unit is defective. Before any rupture of a first mechanical connection takes place, the take-up portion is spared, and is not subjected to any significant stress. Fatigue of the part is avoided. The service life is increased;
- the take-up portion of the retention unit surrounds at least partially the connection area of the cradle support or of the cradle, such that, in the event of a defect in the securing of said connection area of the cradle support or of the cradle on the underface of the motor vehicle, or in the event of a defect in the securing of said connection area on the cradle support or on the cradle, the take-up portion opposes the fall of the cradle. The cradle is retained better, in particular when the vehicle is travelling.

BRIEF DESCRIPTION OF THE DRAWINGS

Other characteristics, details and advantages of the invention will become apparent from reading the following detailed description and the appended drawings, in which:

FIG. 5 is a detailed view in perspective of part of an assembly according to the invention; and FIG. 6 is a detailed view of FIG. 5 from viewpoint different from that in FIG. 5.

DETAILED DESCRIPTION

The following drawings and descriptions contain substantially elements of a certain nature. They can thus be used not only to make the present invention better understood, but also contribute towards its definition, if applicable.

Hereinafter, the terms which define relative positionings such as "top", "bottom", "horizontal", "vertical" and "below" are used in a context in which the wheels of the motor vehicle are supported in a conventional manner on substantially horizontal ground. In this case, "lower surface" means surfaces which are situated on the underface of the vehicle body, and are generally oriented towards the ground.

Substantially parallel perpendicular or at right-angles means a direction/an angle which is spaced by at the most ±20°, or at the most 10°, or at the most 5°, from a direction which is parallel or perpendicular or from a right-angle.

Figure 1:
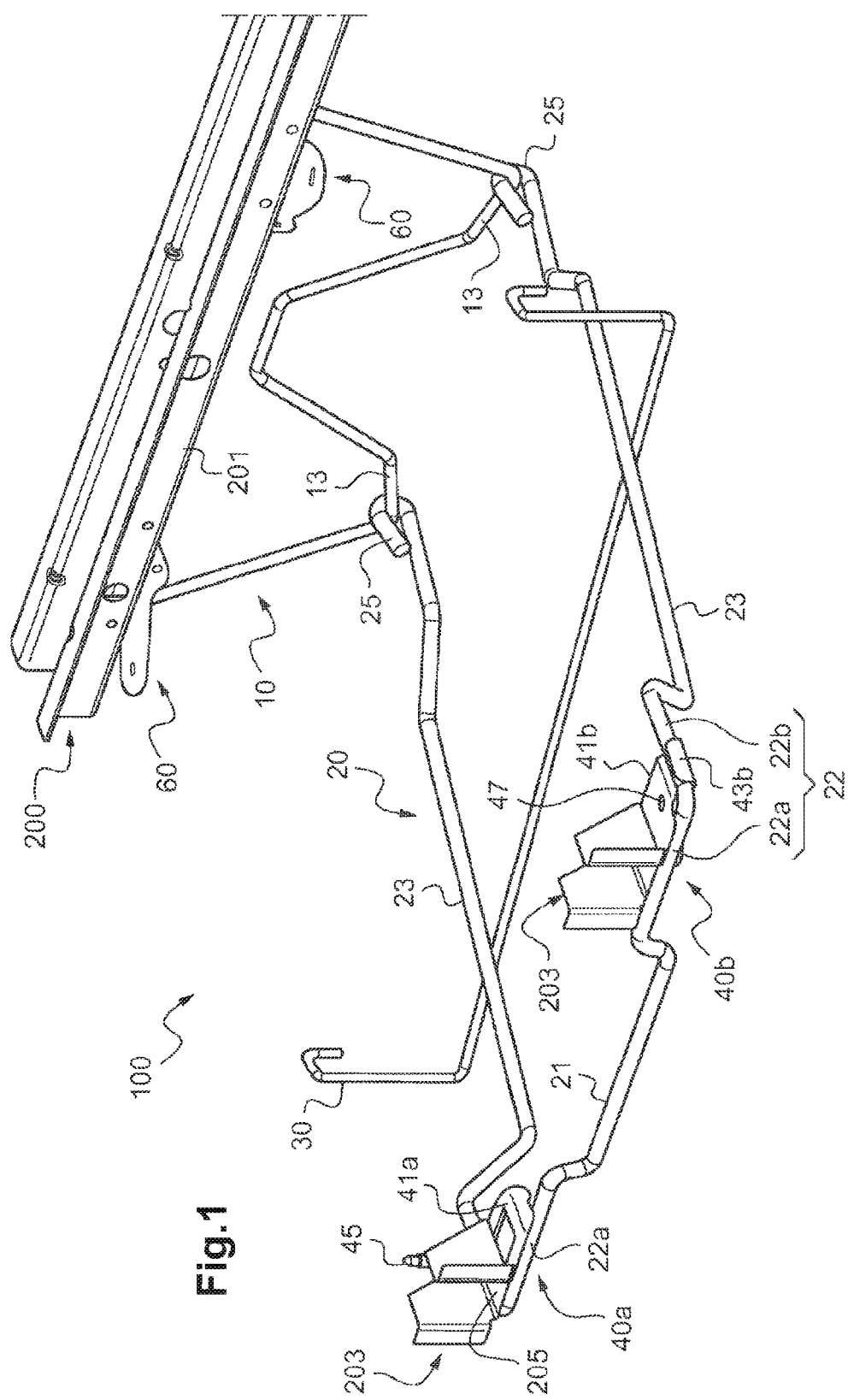
FIG. 1 is a view in perspective of an assembly according to the invention, in which the floor of the vehicle and the spare wheel are not represented.
Figure 2:
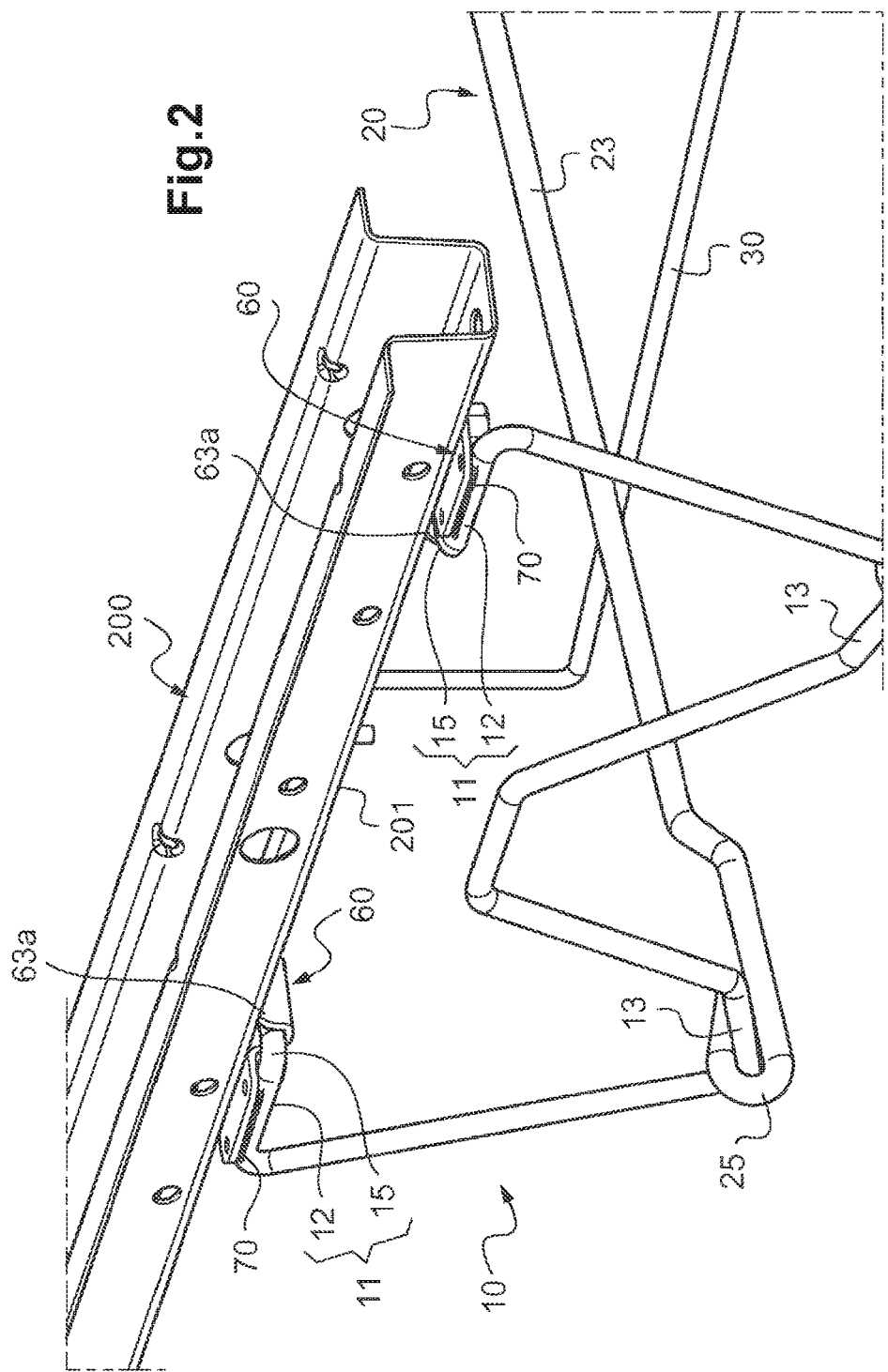
FIG. 2 is a detailed view of the assembly in FIG. 1, seen from a viewpoint opposite that in FIG. 1.

In FIG. 1, a cross-member 200 belonging to the vehicle body is represented. In order to facilitate understanding, the remainder of the vehicle body is not represented. The cross-member 200 supports lower surfaces 201 on the underface of the vehicle. The assembly for retention of a spare wheel of the motor vehicle has the reference 100. The assembly 100 comprises a cradle support 10, a cradle 20, two units 40a, 40b for retention of the cradle 20, and two units 60 for retention of the cradle support 10 which are similar, and optionally a lateral position limiter 30. The assembly 100 has a configuration which is substantially symmetrical according to a vertical plane perpendicular to the lateral direction (left-right) of the vehicle.

In the example described here, the cradle support 10 comprises a rigid metal wire. The metal wire is in the general form of a "W" obtained by bending of rigid metal wire. At each of the end portions of the metal wire, the cradle support 10 comprises a connection area 11. The connection area 11 is broken down into fastener part 12 and a free end part 15. The fastener parts 12 are secured on a lower surface 201 of the cross-member 200 of the motor vehicle, cf. FIGS. 3 and 4. The cradle support 10 additionally comprises two parts which form a pivot 13 in the low area of the form in the shape of a "W". The parts which form a pivot 13 are situated in the low part of the cradle support 10 relative to the fastener parts 12 and to the free end parts 15 situated in the high part of the cradle support 10.

The cradle 20 forms a receptacle for a spare wheel of a motor vehicle. In the example described here, the cradle 20 comprises a rigid metal wire. The cradle 20 is formed by bending rigid metal wire such as to provide the cradle 20 with the general form of a "U".

The cradle 20 comprises a central branch 21, and two lateral branches 23 which extend substantially perpendicularly to the central part 21, and generally parallel relative to one another. The two lateral branches 23 are each extended, at their free end opposite the central branch 21, by a bearing 25. Each bearing 25 corresponds to one of the two end portions of the rigid metal wire, and is formed by bending end portions in the form of a loop. Each loop is disposed around a corresponding part which forms a pivot 13 of the cradle support 10. The loops can be fitted, or directly formed by bending, around the pivots 13. The pivots 13 of the cradle support 10 and the bearings 25 of the cradle 20 cooperate in order to pivot the cradle 20 relative to the cradle support 10. The cradle 20 pivots around a geometric axis which is substantially parallel to the cross-member 200. The cradle 20 is suspended on the cradle support 10 by means of the bearing 25/pivot 13 assemblies.

The cradle 20 can be pivoted between a closed position, in which the handling of a spare wheel is prevented, and an open position, in which the handling of the spare wheel is permitted. In this case, handling of the wheel means the insertion of a spare wheel in the receptacle formed by the cradle 20, or the extraction of a spare wheel from the receptacle formed by the cradle 20, depending on the situations. When a spare wheel is accommodated in the cradle 20, the spare wheel is supported on each of the lateral branches 23 of the cradle 20. The central branch of the cradle 20 acts as a handle during the pivoting. In the open position, the central branch 21 is in the low position. In the closed position, the central branch 21 is in the high position.

At each of the intersections of its lateral branches 23 and its central branch 21, the cradle 20 additionally comprises a connection area 22 comprising a fastener part 22a and a free part 22b. The fastener parts 22a are secured in a removable manner on the underface of the motor vehicle.

In the example described here, the lateral position limiter 30 comprises a rigid metal wire in the form of a "U" obtained by bending of the wire. The lateral position limiter 30 comprises two short branches which extend substantially vertically from the underface of the vehicle, and the lower ends of which are extended substantially at right-angles, and are joined by a longer third branch which extends substantially according to the lateral direction of the vehicle. The third branch is disposed perpendicularly below each of the lateral branches 23 of the cradle 20. The lateral position limiter 30 is formed such as to position the spare wheel laterally, in other words substantially parallel to a transverse direction of the vehicle, and thus prevent any interference between the spare wheel and the underpart of the vehicle body during handling of the cradle 20. The bent ends of the short branches form a non-aggressive area for the operator in the factory.

The cradle support 10, the cradle 20 and the lateral position limiter 30 are is case produced by bending a similar metal wire. In variants, different metal wires can be used for the cradle support 10, the cradle 20 and the lateral position limiter 30. Production by bending makes it possible to avoid the creation of fragile connections such as welding spots. The different parts can be produced from other materials, for example plastic materials and/or in the form of tubes, formed bars, or even flexible wires. As a variant, the cradle support 10, the cradle 20 and/or the lateral position limiter 30 can be produced by assembling a plurality of parts. In addition, certain parts can be covered with a covering in order to improve the resistance to corrosion and/or avoid noises of the rattling type derived from the vibrations of the vehicle. Units which facilitate the pivoting, such as rings or roller bearings, can be provided between the bearings 25 and the pivots 13.

Figure 3:
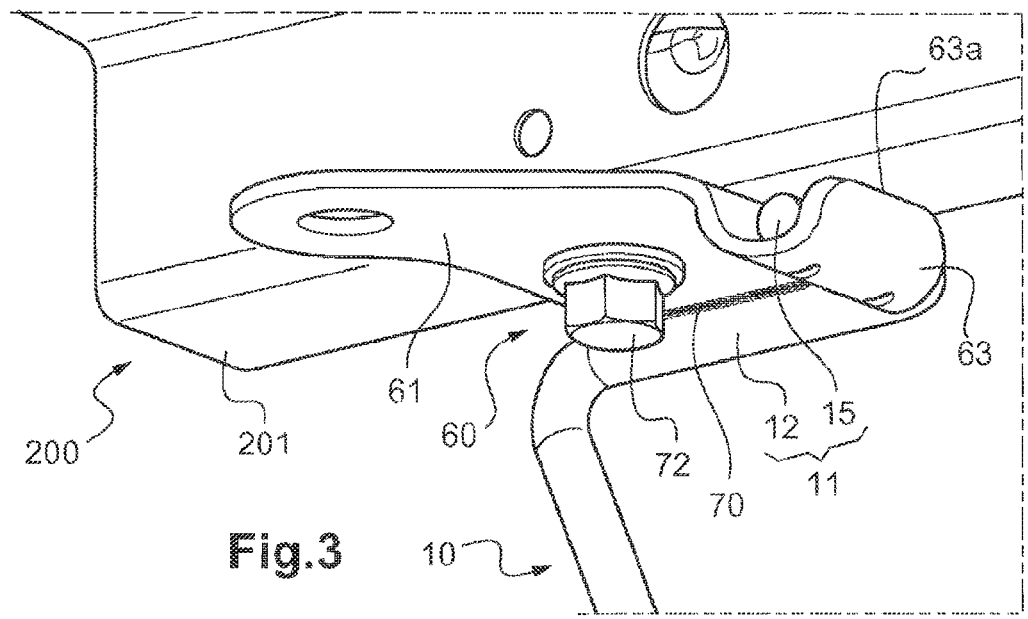
FIG. 3 is a detailed view in perspective of part of an assembly according to the invention.
Figure 4:
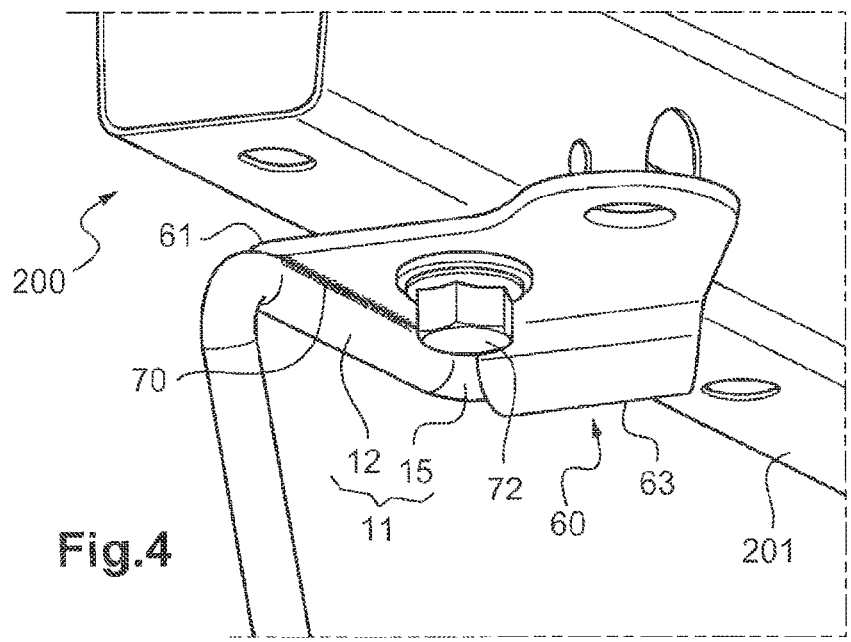
FIG. 4 is a detailed view of FIG. 3 from a viewpoint different from that in FIG. 3.

Reference now made to FIGS. 3 and 4. In this case, the retention unit 60 is produced by bending a metal sheet or plate. As a variant, the retention unit 60 can be made by molding, drawing and/or machining. The retention unit 60 comprises a securing portion 61 and a take-up portion 63 or lug.

The securing portion 61 has a substantially flat form. The securing portion 61 is provided with two through holes, one of which receives a screw 72. In this case, the securing portion 61 is in contact with a lower surface 201 of the vehicle. The lower surface 201 of the vehicle is in this case supported by the cross-member 200. The securing portion 61 is retained against the lower surface 201 by the screw 72. The screw 72 is engaged in the cross-member 200 and in a corresponding nut (not shown in the figures). The nut is supported against the cross-member 200. As a variant, the nut can be integral with the cross-member 200, for example it can be welded on it. The securing of the retention unit 60 on the underface of the vehicle by means of a removable fastener, such as a screw-nut pair, makes it possible to dismantle the retention unit 60 and the assembly 100 from the remainder of the vehicle if necessary. As a variant, the retention unit 60 can be secured definitively on the remainder of the vehicle, for example by means of welding or adhesion.

The fastener part 12 of the connection area 11 is oriented substantially parallel to the cross-member 200. The fastener part 12 of the connection area 11 is oriented substantially according to a lateral direction of the vehicle. The free end part 15 extends the fastener part 12 substantially at right-angles. The free end part 15 extends substantially according to a direction perpendicular to the cross-member 200. The free end part 15 extends substantially according to a longitudinal direction (from front to rear) of the vehicle. The substantially right-angle between the fastener part 12 and the free end part 15 of the connection area 11 is obtained by bending metal wire when the cradle support 10 is formed.

The fastener part 12 is secured on the underface of the vehicle. In the example described here, this securing is indirect: the fastener part 12 is secured by welding against the retention unit 60. The retention unit 60 is secured on a lower surface 201 of the cross-member 200. This indirect securing facilitates the assembly: the securing between the cradle support 10 and the retention unit 60 can be carried out before the installation below the vehicle body, then, in a second stage, the retention unit 60 which is integral with the cradle support 10 can be secured on the body of the vehicle. As a variant, the cradle support 10 is secured directly on the underface of the vehicle, for example directly against the lower surface 201 of the cross-member 200.

The fastener part 12 is rendered integral with the cross-member 200, and thus with the vehicle body. In this case, this securing is obtained by welding of the fastener part 12 on a surface which is oriented downwards of the securing portion 61 of the retention unit 60. A welding bead bears the reference 70 in the figures. This securing constitutes a mechanical connection between the cradle support 20 and the body or chassis of the vehicle.

In variants, the mechanical connection can be obtained by means other than welding, for example adhesion, drawing, riveting, screwing and/or any other means which are appropriate according to the technical constraints.

The take-up portion 63 supplements the mechanical connection between the fastener part 12 and the lower surface 201, in order to prevent an abnormality in the mechanical connection. In this case, take-up portion 63 means a portion which serves the purpose of taking up, i.e. preventing the fall of, the cradle support 10 in an incident situation in which a fastener of the cradle support 10 on the underface of the vehicle fails. The take-up portion 63 then acts as a mechanical standby for the securing between the fastener part 12 and the lower surface 201.

In this case, the take-up portion 63 in the form of a hook. The take-up portion 63 forms a projection downwards relative to the plane of the securing portion 61. The take-up portion 63 has a concave surface which is oriented upwards. The concave surface forms a seat for receipt of the free end part 15 of the cradle support 10. The form and dimensions of the take-up portion 63 are adapted according to the form and dimensions of the connection area 11, and in particular the free end part 15 of the cradle support 10 which it accommodates in the installed state. The take-up portion 63 extends below the connection area 11 and in particular below the free end part 15 of the cradle support 10. In the example described here, the inner space defined by the take-up portion 63 has a generally elongate form perpendicularly to the cross-member 200, i.e. substantially according to a longitudinal direction of the vehicle. The inner space forms a groove. The groove has a substantially constant cross-section according to the longitudinal direction. The cross-section of the groove is substantially rounded with a diameter which is larger than, or equal to, the diameter of the metal wire which constitutes the free end part 15 of the connection area 11 of the cradle support 10.

The free end part 15 of the connection area 11 of the cradle support 10, in the installed state, is accommodated above the take-up portion 63, in this case in the rounded groove. For as long as the mechanical connection between the fastener part 12 and the lower surface 201 of the vehicle is effective, i.e. the connection between the fastener part 12 and the retention unit 60 in the present example, the take-up portion 63 is inactive. The free end part 15 can be in contact with, or slightly spaced above, the take-up portion 63. The cradle support 10 is supported by means of the mechanical connection, in this case the welding bead 70 and the fastener part 12, which is thus subjected to traction. In the case of a defect of this mechanical connection, for example rupture of the welding bead 70, the fastener part 12 drops and the free end part 15 is taken up by the take-up portion 63.

Complete falling of the cradle support 10 is prevented. The free end part 15 is then supported on the take-up portion 63. In other words, the fastener part 12 of the connection area 11 forms a first mechanical connection in normal functioning, and the free end part 15 of the connection area 11 forms a second, standby mechanical connection, in the case of malfunctioning of the first mechanical connection.

A free end 63a of the take-up portion 63 is curved upwards. In the example described here, the free end 63a is curved upwards substantially as far as the plane of the securing portion 61. In the state in which it is secured against the lower surface 201 of the cross-member 200, the free end 63a of the take-up portion 63 comes into contact with, or is spaced slightly apart from, the lower surface 201. In other words, the take-up portion 63 extends below the free end part 15 of the connection area 11 and surrounds it partially. Thus, falling of the free end part 15 from the receptacle formed in the take-up portion 63 by translation and/or sliding in a substantially lateral direction is prevented. The free end 63a of the take-up portion 63 acts as an anti-fall rim. As a variant, the take-up portion 63 is arranged below the connection area 11. The groove surrounds the free end part 15 around 90° to 180° of the cross-section.

Reference is now made to FIGS. 5 and 6. The retention assembly 100 additionally comprises at least one unit for retention of the cradle 20 arranged on the cradle 20 side opposite the pivots 13. In order to facilitate access to the spare wheel by a user, the central branch 21 which acts as a handle and the units for retention of the cradle 20 are situated in the vicinity of the rear end of the vehicle.

In the example represented, the assembly 100 comprises a left-hand retention unit 40a for the cradle 20 and a right-hand retention unit 40b for the cradle 20. The retention units 40a, 40b are secured in a removable manner on the underface of the motor vehicle. Two angle irons 203 which are integral with the vehicle body are represented in the figures. The faces which are oriented downwards of the angle irons in this case constitute lower surfaces 205 which belong to the underface of the vehicle.

The retention units 40a and 40b are similar to the retention unit 60 for the cradle support 10 described with reference to FIGS. 3 and 4. In this case, each retention unit 40a, 40b is produced by bending a metal sheet or plate. As a variant, the retention unit 40a, 40b can be produced by molding, drawing and/or machining.

Each retention unit 40a, 40b comprises a securing portion 41a, 41b respectively, and a take-up portion 43a, 43b respectively, or lug.

Each securing portion 41b has a substantially flat form. The securing portion 41a of the left-hand retention unit 40a is provided with a through opening 44. The securing portion 41b of the right-hand retention unit 40b is also provided with a through hole 47 which receives a screw (not represented in the figures). The securing portions 41a, 41b are secured on a lower surface 205 of the motor vehicle. The left-hand securing portion 41a is secured by means of the screw 45. The screw 45 passes through the left-hand securing portion 41a and engages in a nut 46 which is supported by the angle iron 203. The right-hand securing portion 41b is secured by another screw, not represented, on the lower surface 205 of the angle iron 203.

The securing between the securing portions 41a, 41b and the lower surface 25 of the vehicle is removable. By means of complete unscrewing of the screws on the right-hand and left-hand sides, the left-hand 41a and right-hand 41b securing portions can be separated from the angle irons 203. The cradle 20 can then be pivoted towards its opening position.

In the embodiment represented in the figures, complete unscrewing of the left-hand screw 45 is superfluous. Loosening the screw 45 is sufficient to permit manual sliding of the securing portion 41a relative to the lower surface 205. Sliding of this type of the securing portion 41a (towards the left in FIG. 5) and resilient deformation of the cradle 20 are sufficient to align the screw 45 and the opening 44 in the securing portion 41a. The opening 44 has a size larger than the head of the screw 45. Thus, the securing portion 41 can be withdrawn downwards, by making the screw head 45 pass through the opening 44. The screw 45 continues to be engaged in the corresponding nut, integrally with the angle iron 203. Falling onto the ground and loss of the screw 45 are avoided. In a variant, the screw 45 is designed to make impossible complete unscrewing and removal of the screw 45. The differences between the openings 46, 47 in the two securing portions 41a and 41b form an exception to the symmetrical nature of the assembly 100.

As previously stated, the connection areas 22 of the cradle 20 are secured in a removable manner on the underface of the motor vehicle. In the example described here, this securing is indirect, which makes it possible to facilitate the assembly, as already stated for the retention unit 60. The fastener part 22a is secured by welding against the left-hand retention unit 40a, which itself is secured in a removable manner on a lower surface 205 of the vehicle, as already described. In this case, the fastener part 22a is secured on a surface which is oriented downwards of the plate 41a of the left-hand retention unit 40a by means of a welding bead 50 (FIG. 5). This securing constitutes a mechanical connection between the cradle 20 and the body or chassis of the vehicle. The securing of the fastener part 22a on the securing portion 41b of the right-hand retention unit 40b is similar. In variants, the mechanical connection can be obtained by other means, for example by gluing, drawing, screwing and/or any other appropriate means.

Each retention unit 40a, 40b of the cradle 20 has a take-up portion 43a, 43b respectively, similar to the take-up portion 63 of the connection unit 60, which acts as a supplement to the mechanical connection between the fastener part 22a and the lower surface 205, in order to prevent an abnormality of the mechanical connection. Thus, the take-up portions 43a, 43b also serve the purpose of preventing falling of the cradle in a situation in which securing of the cradle on the underface of the vehicle fails.

In the present example, the take-up portions 43a, 43b, which are identical to the take-up portion 63, extend below the connection area 22, and have a concave surface which is oriented upwards and receives the free part 22b of the connection area 22 of the cradle 20. In the example described here, the inner space defined by the take-up portion 43a, 43b has an elongate form, and also extends substantially according to a longitudinal direction of the vehicle. However, the invention is not limited to this orientation. The dimensions of the groove formed by the inner space are similar to those of the take-up part 63 of the retention unit 60.

Thus, the free part 22b of the connection area 22 of the cradle, the installed state, is accommodated above the take-up portion 43a, 43b. For as long as the mechanical connection between the fastener part 22a and the lower surface 205 is effective, i.e. in this case the connection between the fastener part 22a and the retention unit 43a, 43b, the take-up portion 43a, 43b is inactive. The free part 22b can be in contact with, or slightly spaced above, the take-up portion 43a, 43b. The cradle 20 is supported by means of the mechanical connection, in this case the welding bead 50 and the fastener part 22a, which is subjected to traction. In the event of failure of this mechanical connection, for example rupture of the welding bead 50, the fastener part 22a falls, and the free part 22b is taken up by the take-up portion 43a, 43b, thus preventing complete falling of the cradle 20.

The take-up portion 43a, 43b can also have a free end which is formed such as to act as an anti-fall rim, like the take-up portion 63 of the retention unit 60.

The securing portions 41a, 41b and the take-up portions 43a, 43b respectively of the retention units 40a, 40b described here have similarities of form with the securing portions 61 and the take-up portions 63 of the retention units 60. This makes it possible to facilitate the production of the parts, for example by using the same basic materials, such as metal plates, from which the parts are cut out and pierced before being bent. The retention units 40a, 40b and 60 have the common purpose of supporting the weight of the cradle support 10, the cradle 20 and the spare wheel which is accommodated in it. However, the retention units 40a, 40b can be operated by a user in order to release the cradle 20, whereas the retention units 60 serve the purpose of retaining the cradle support 10 in all from circumstances (apart dismantling for maintenance or repair).

In this case, the retention units 40a, 40b of the cradle 20 thus form a lock which is designed to lock the cradle 20 in the closed position.

Thanks to the mechanical standby provided by the take-up portion 63, 43a, 43b, the vehicle can continue to travel, since the cradle 20 is retained, even in the case of failure of the mechanical connection between the fastener part 12 and the lower surface 201 and/or between the fastener part 22a and the lower surface 205. A major risk for safety, an immediate immobilization of the vehicle, and urgent repair, are avoided.

The invention is not limited to the assemblies described above purely by way of example, but incorporates all the variants which persons skilled in the art could envisage within the context of the following claims.

The invention claimed is:

1. An assembly for retention of a spare wheel of a motor vehicle, comprising:
a cradle comprising a connection area secured in a removable manner on an underface of the motor vehicle, said cradle being U-shaped and including two lateral branches and a central branch, each of the lateral branches including a fixed end attached to the central branch and a free end opposite to the fixed end, said cradle being configured to accommodate the spare wheel of the motor vehicle, the cradle being fitted such as to pivot between a closed position, in which handling of the spare wheel is prevented, and an open position, in which the handling of the spare wheel is permitted;

a cradle support comprising a wire extending between connection areas secured on the underface of the motor vehicle, wherein the free end of each of the lateral branches is attached to the wire of the cradle support such that the cradle support forms a pivot for the cradle; and at least one unit to retain the cradle support or the cradle, the retention unit comprising a take-up portion that extends below the connection areas of the cradle support or the cradle.

2. The assembly as claimed in claim 1, wherein the unit to retain the cradle support or the cradle is secured on the underface of the motor vehicle.

3. The assembly as claimed in claim 1, wherein the connection areas of the cradle support are secured on the underface of the motor vehicle at least partly by welding.

4. The assembly as claimed in claim 1, wherein the connection areas of the cradle support are secured on the underface of the motor vehicle at least partly by screwing or clamping.

5. The assembly as claimed in claim 1, wherein the take-up portion of the retention unit is a hook.

6. The assembly as claimed in claim 1, wherein the retention unit comprises a bent metal plate.

7. The assembly as claimed in claim 1, wherein the retention unit and the cradle support or the cradle are welded to one another.

8. The assembly as claimed in claim 1, wherein the retention unit is made in a single piece.

9. The assembly as claimed in claim 1, wherein the take-up portion of the retention unit is designed to be active only when the securing of the cradle support or the cradle on the underface of the motor vehicle is defective, or when the securing of the connection areas on the retention unit is defective.

10. The assembly as claimed in claim 1, wherein the take-up portion of the retention unit surrounds at least partially the connection areas of the cradle support or of the cradle, such that, in the event of a defect in the securing of said connection areas of the cradle support or of the cradle on the underface of the motor vehicle, or in the event of a defect in the securing of said connection areas on the cradle support or on the cradle, the take-up portion opposes the fall of the cradle.

11. The assembly as claimed in claim 1, wherein the free end of each of the lateral branches of the cradle forms a loop around the cradle support.

12. The assembly as claimed in claim 1, wherein the wire of the cradle support is W-shaped.

13. The assembly as claimed in claim 12, wherein the connection areas of the cradle support include a first connection area at a first end of the cradle support and a second connection area at a second end of the cradle support.

14. The assembly as claimed in claim 13, wherein the free end of each of the lateral branches of the cradle is looped around the cradle support at a low area of cradle support.

15. The assembly as claimed in claim 1, wherein the lateral branches of the cradle are parallel relative to one another.

16. The assembly as claimed in claim 1, wherein the lateral branches of the cradle are perpendicular relative to the central branch.

* * * * *